United States Patent
Hobbet et al.

(10) Patent No.: US 8,037,320 B2
(45) Date of Patent: Oct. 11, 2011

(54) MAGNETIC RECORDING MEDIUM ENCRYPTION

(75) Inventors: Jeffrey R. Hobbet, Holly Springs, NC (US); Takashi Sugawara, Machida (JP); Hiroaki Yasuda, Fujisawa (JP)

(73) Assignee: Lenovo (Singapore) Pte. Ltd, Singapore (SG)

( * ) Notice: Subject to any disclaimer, the term of this patent is extended or adjusted under 35 U.S.C. 154(b) by 1167 days.

(21) Appl. No.: 11/695,018

(22) Filed: Mar. 31, 2007

(65) Prior Publication Data
US 2008/0240428 A1 Oct. 2, 2008

(51) Int. Cl.
*G06F 21/00* (2006.01)
(52) U.S. Cl. ............... 713/193; 713/22; 713/189
(58) Field of Classification Search ............ 713/22, 713/189, 193
See application file for complete search history.

(56) References Cited

U.S. PATENT DOCUMENTS

| | | | | |
|---|---|---|---|---|
| 5,581,740 A | * | 12/1996 | Jones ........................... | 703/25 |
| 5,677,900 A | * | 10/1997 | Nishida et al. ............. | 360/13 |
| 7,194,091 B2 | * | 3/2007 | Higashi et al. ............. | 380/202 |
| 2002/0154779 A1 | * | 10/2002 | Asano et al. ............... | 380/277 |
| 2007/0288713 A1 | * | 12/2007 | Sugimoto et al. ......... | 711/162 |
| 2008/0072071 A1 | * | 3/2008 | Forehand et al. ......... | 713/193 |

OTHER PUBLICATIONS

Technology Paper, Full Disc Encryption—Best-in-Class Data Protection, TP-541, From: Global Product Marketing, Jun. 2005, www.seagatestorage.com, Seagate Technology, LLC, Scotts Valley, California, USA.

* cited by examiner

*Primary Examiner* — Vivek Srivastava
*Assistant Examiner* — Helai Salehi
(74) *Attorney, Agent, or Firm* — Ference & Associates LLC

(57) ABSTRACT

Systems and methods for easily and at high speed re-encrypting data recorded on a magnetic recording medium when the data is encrypted using an encryption key and the encryption key is changed. A track where effective user data is not recorded is set as a first reserved track, then data is read out from the first updating source track and decrypted using a first encryption key KEY 1, which is reencrypted using a second encryption key KEY 2 and recorded in the first reserved track, next, the first updating source track is set as a second reserved track, and a second updating source track is set, and the encryption key is updated by repeating these steps until all tracks to be subjected to the key updating processing have been subjected to the key updating processing.

20 Claims, 12 Drawing Sheets

FIG. 2

| LT (Logical Track) | PT (Physical Track) |
|---|---|
| 0 | 1000 |
| 1 | 1001 |
| 2 | 1002 |
| ... | ... |
| z | x |
| z+1 | x+1 |
| ... | ... |
| MAX Track | 100,000 |

MAGNETIC RECORDING MEDIUM ENCRYPTION

FIELD OF THE INVENTION

The present invention relates to magnetic recording medium encryption, and more particularly, to re-encrypting data on a magnetic recording medium when the encryption key has been changed. While the present invention is widely applicable to various kinds of magnetic recording devices for recording data in a magnetic recording medium, it is particularly useful for a hard disk device.

BACKGROUND OF THE INVENTION

A hard disk device (HDD) is a magnetic recording device used for storing information. In general, information is recorded on concentric tracks present on any one of both surfaces of one or more magnetic recording disks. A disk is rotatably supported by a spindle motor. Writing information on the tracks and reading out information from the tracks are carried out by a recording/reproducing head equipped to an actuator arm. The actuator arm is rotated by a voice coil motor. The voice coil motor is excited by electric current, and causes an actuator to rotate, and the recording/reproducing head to move. The recording/reproducing head makes out information by sensing the change of a magnetic field from the surface of the disk. In order to record data on the tracks, electric current is supplied to the recording/reproducing head. The electric current supplied to the recording/reproducing head cause a magnetic field to occur, which magnetizes the surface of the disk.

In recent years, accompanied with a technological evolution of methods for attacking security by a hacker, security of an external storage medium such as a hard disk device has been improved. In a known hard disk device, the HDD password is supported by an advance technology attachment (ATA) security command, which contributes to protect data in the hard disk device. In some cases, however, the HDD password may be broken by a hacker's analysis of firmware of the hard disk device and large scale integrated circuit (LSI).

In order to address such a problem, in recent years, the Seagate company has been proposed a technology called Full Disk Encryption (hereinafter referred to as "FDE") (for example, http dot dot slash slash fde dot seagatestorage dot corn slash). FDE has a function to encrypt all of the data on the disk using an encryption key, thereby improving security of the data.

In such a FDE, unless the encryption key is known, even if the data on the disk is directly read out, the data cannot be decrypted. Moreover, FDE has an advantage in that, even if the HDD password is broken by means of operation of firmware and LSI, the data on the disk cannot be decrypted unless the encryption key is decrypted.

However, in FDE, since the encryption key is set in advance before a HDD or a system is shipped, there exists a problem that a user cannot change the encryption key. The user therefore has to use the encryption key set before the HDD is shipped and without changing it. As such, if the data in the HDD is stolen, the possibility exists the management of the HDD manufacturer responsible for the encryption key before shipping will be charged.

In view of the foregoing, a need has been recognized in connection with improving upon the shortcomings and difficulties of conventional efforts so that an encryption key may be changed easily and in a high speed when data recorded on a magnetic recording medium is encrypted using the encryption key.

SUMMARY OF THE INVENTION

There are broadly contemplated herein, in accordance with at least one presently preferred embodiment of the present invention, new apparatus and methods for re-encrypting data recorded on a magnetic recording medium when the data is encrypted using an encryption key and the encryption key is changed.

In summary, one aspect of the invention provides a system comprising: a setting module configured to set a pair of a updating source area and a reserved area for each unit of a magnetic recording medium; a reading module configured to read data encrypted using a first encryption key from the updating source area and decrypt the data using the first encryption key; a re-encryption module configured to re-encrypt the decrypted data using the second encryption key, and recording the re-encrypted data in the reserved area; and wherein, the setting module is further configured to: (a) set an area where effective user data is not recorded as a first reserved area and set a first updating source area; (b) set a second area where at least one of the first updating source area and effective user data is not recorded as a second reserved area and set a second updating source area; and (c) repeat (a) and (b) until all areas containing data encrypted using a first encryption key have been read, the data has been decrypted, the decrypted data has been re-encrypted, and the re-encrypted data has been recorded.

Another aspect of the invention provides a method comprising: setting a pair of a updating source area and a reserved area for each unit of a magnetic recording medium; reading data encrypted using a first encryption key from the updating source area and decrypting the data using the first encryption key; re-encrypting the decrypted data using the second encryption key, and recording the re-encrypted data in the reserved area; and wherein in the setting step comprises: (a) setting an area where effective user data is not recorded as a first reserved area and setting a first updating source area; (b) setting a second area where at least of the first updating source area and effective user data is not recorded as a second reserved area and setting a second updating source area; and (c) repeating (a) and (b) until all areas containing data encrypted using a first encryption key have been read, the data has been decrypted, the decrypted data has been re-encrypted, and the re-encrypted data has been recorded.

Furthermore, an additional aspect of the invention provides a computer program product readable by machine, tangibly embodying a program of instructions executable by the machine to perform a method comprising the steps of: setting a pair of a updating source area and a reserved area for each unit of a magnetic recording medium; reading data encrypted using a first encryption key from the updating source area and decrypting the data using the first encryption key; re-encrypting the decrypted data using the second encryption key, and recording the re-encrypted data in the reserved area; and wherein in the setting step comprises: (a) setting an area where effective user data is not recorded as a first reserved area and setting a first updating source area; (b) setting a second area where at least of the first updating source area and effective user data is not recorded as a second reserved area and setting a second updating source area; and (c) repeating (a) and (b) until all areas containing data encrypted using a first encryption key have been read, the data has been decrypted, the decrypted data has been re-encrypted, and the re-encrypted data has been recorded.

BRIEF DESCRIPTION OF THE DRAWINGS

FIG. 2 illustrates one example of a matrix table.

DESCRIPTION OF THE PREFERRED EMBODIMENTS

Figure 1:
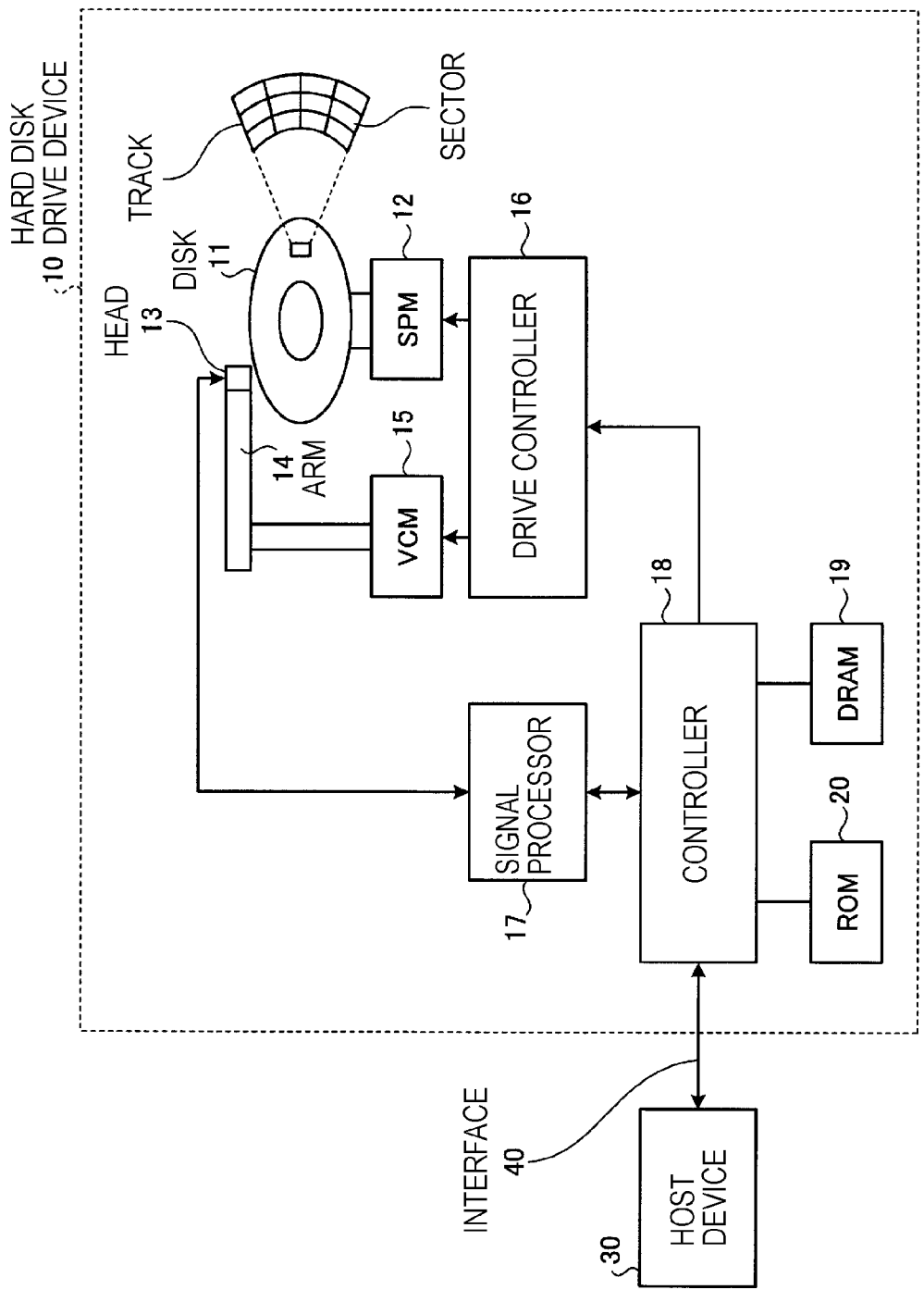
FIG. 1 illustrates a schematic configuration of an exemplary hard disk device applied by a magnetic recording device according to a preferred embodiment of the present invention.

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus and method of the present invention, as represented in FIGS. 1 through 12, is not intended to limit the scope of the invention as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

It should be noted that in the following description, the updating of the encryption key is performed for each track or sector of a disk, and the updating source track or sector is referred to as an "updating source area", and the reserved track or sector of the area to be updated is referred to as a "reserved area".

Referring now to FIG. 1, a schematic configuration example of a hard disk device applying a magnetic recording device according to the present invention is shown. In the following description, a disk is subjected to FDE using a first encryption key KEY 1. The hard disk device 10, as shown in FIG. 1, includes a disk 11, a SPM (Spindle Motor) 12, a head 13, an arm 14, a VCM (Voice Coil Motor) 15, a drive controller 16, a signal processor 17, a controller 18, a DRAM 19, and a ROM 20.

The disk 11 is a disk as a magnetic recording medium, where a various kinds of externally inputted data is recorded. In the disk 11, a plurality of tracks T with a plurality of sectors S are formed on concentric circles. The sector usually has a size of 512 bytes, where positional information of data recorded for each sector is managed. The SPM 12 drives the disk 11 to rotate. The head 13 performs reading out and writing of signals with respect to the disk 11. The arm 14 fixes and supports the head 13. The VCM 15 feeds the head 13 and the arm 14 in the radial direction of the disk 11. The drive controller 16 includes drive circuits for driving the SPM 12 and the VCM 15, respectively, and performs the drive control of the SPM 12 and the VCM 15.

The signal processor 17 encodes the data to be written in the disk 11 and decodes the data read out from the disk 11, and, at that time, also performs encoding by means of an error-correcting code, and processing with respect to error detection and error correction.

The controller 18 is configured with a CPU or the like and has a function of controlling the entire operation of the hard disk device 10. According to the firmware stored in the ROM 20, the operation of the hard disk device 10 is controlled. The ROM 20 stores the firmware executed by the controller 18. The DRAM 19 is used as a working area of the controller 18 and as a buffer of data read out from the disk 11 and data to be written in the disk 11. The controller 18 has a function of encryption/decryption for encrypting/decrypting the data on the DRAM (buffer) 19.

Moreover, the controller 18 constitutes an inputting/outputting circuit for sending/receiving data, controlling command, and the like between itself and host devices 30 such as a Personal Computer or an audio visual system via an interface 40. Where, the interface includes an IDE (Integrated Drive Electronics), a SCSI (Small Computer System Interface), a FC (Fiber Channel), a USB (Universal Serial Bus), or the like.

The above mentioned controller 18 executes the below described key updating processing, and acts as: setting module configured to set a pair of the updating source track and the reserved track for each track of the disk 11; reading module configured to read out data encrypted using the first encryption key KEY 1 from the updating source area set by the setting module and decrypt the data using the first encryption KEY 1; re-encrypting module configured to reencrypt the data decrypted by the reading module using a second encryption key KEY 2, and for recording the data in a reserved track set by the setting module; under key updating flag recording module configured to record the under key updating flag indicating whether the key updating processing is continuing or not, in the disk 11; and control flag recording module configured to record a control flag (CF) indicating that data is encrypted using the second encryption key, in the control flag sector (CF sector) of the reserved track, every time when writing of the data with respect to the reserved track is completed.

FIG. 2 is a view showing one example of a matrix table associating a Logical Track (LT) with a Physical Track (PT). The matrix table is installed in firmware, and as shown in FIG. 2, each of the Logical Tracks (LT) is assigned with one Physical Track (PT). When key updating processing is executed, the controller 18 changes allocation of the PT with respect to the LT to update the matrix table.

The schematic operation of the hard disk device 10 constituted as FIG. 1 will now be described. Upon reception of a command (such as a writing/reading out command) issued by the host device 30 via the interface 40, the controller 18 interprets the content, sets commands and parameters required for the drive controller 16 and the signal processor 17, and thereby cause them to execute their operation. Being commanded to write data from the host device 30, the controller 18, using the first encryption key KEY 1, encrypts the data received from the host device 30 to output to the signal processor 17.

The drive controller 16 performs drive controlling of the SPM 12 and the VCM 15 to move the head 13 with respect to a predetermined track and sector of the disk 11. During writing the data sent from the controller 18 in the disk 11, the signal processor 17 encodes (modulates) the data into digital bit series. Moreover, during reading out, the signal processor 17 removes high frequency noises from the read out signal, then converts the signal from an analog signal to a digital signal, and further, subjects the signal to ECC (Error Correction Code) error correction, subsequently outputs it to the controller 18. The controller 18, using the first encryption key KEY 1, decrypts the data inputted from the signal processor, then transfers it to the host device 30.

Figure 3:
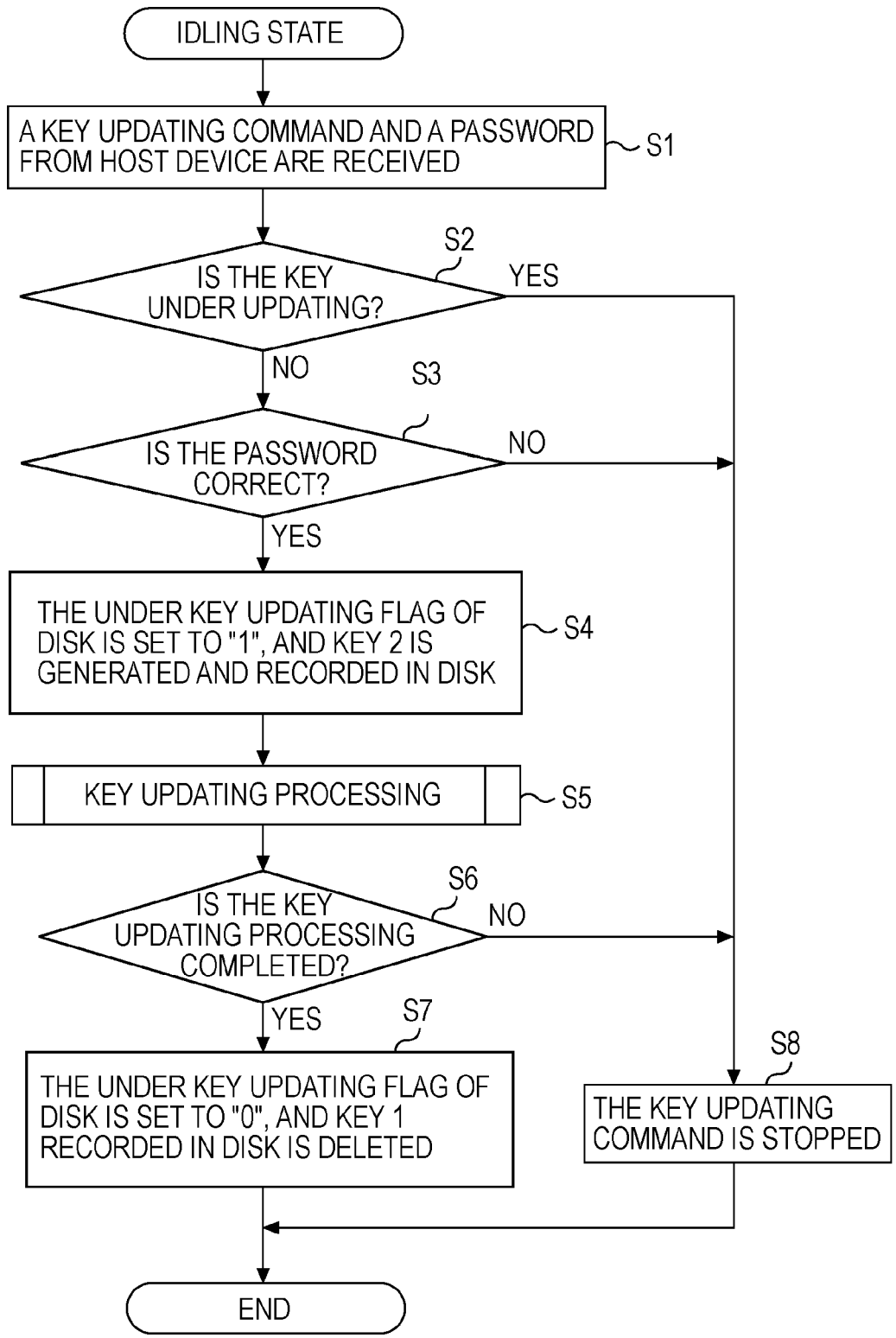
FIG. 3 illustrates a flowchart detailing the process for updating an encryption key.

Next, with reference to FIGS. 3 to 6, the key updating processing will now be described in detail. FIG. 3 is a flowchart for explaining the procedure of the key updating processing.

In FIG. 3, upon reception of passwords (user password and/or master password) and a key updating command from the host device 30 (step S1), the controller 18 determines whether the key is already under updating or not (step S2), and when the key is already under updating ("yes" in step S2), stops the key updating command (step S8).

When the key is not under updating ("No" in step S2), the controller 18 determines whether the passwords are correct or not (step S3). When the controller 18 determines that the passwords are not correct ("No" in step S3), it stops the key updating command (step S8). On the contrary, when the controller 18 determines that the passwords are correct ("Yes" in step S3), it sets the under key updating flag recorded in the disk 11 to "1", and generates the second encryption key (updating key) KEY 2, then record it in the disk 11 (step S4).

After that, the controller 18 executes the key updating processing (refer to FIGS. 4 to 6) (step S5). Upon completion of the key updating processing ("Yes" in step S6), the controller 18 sets the under key updating flag of the disk 11 to "0", and deletes the first encryption key (old key) KEY 1 (step S7).

Figure 4:
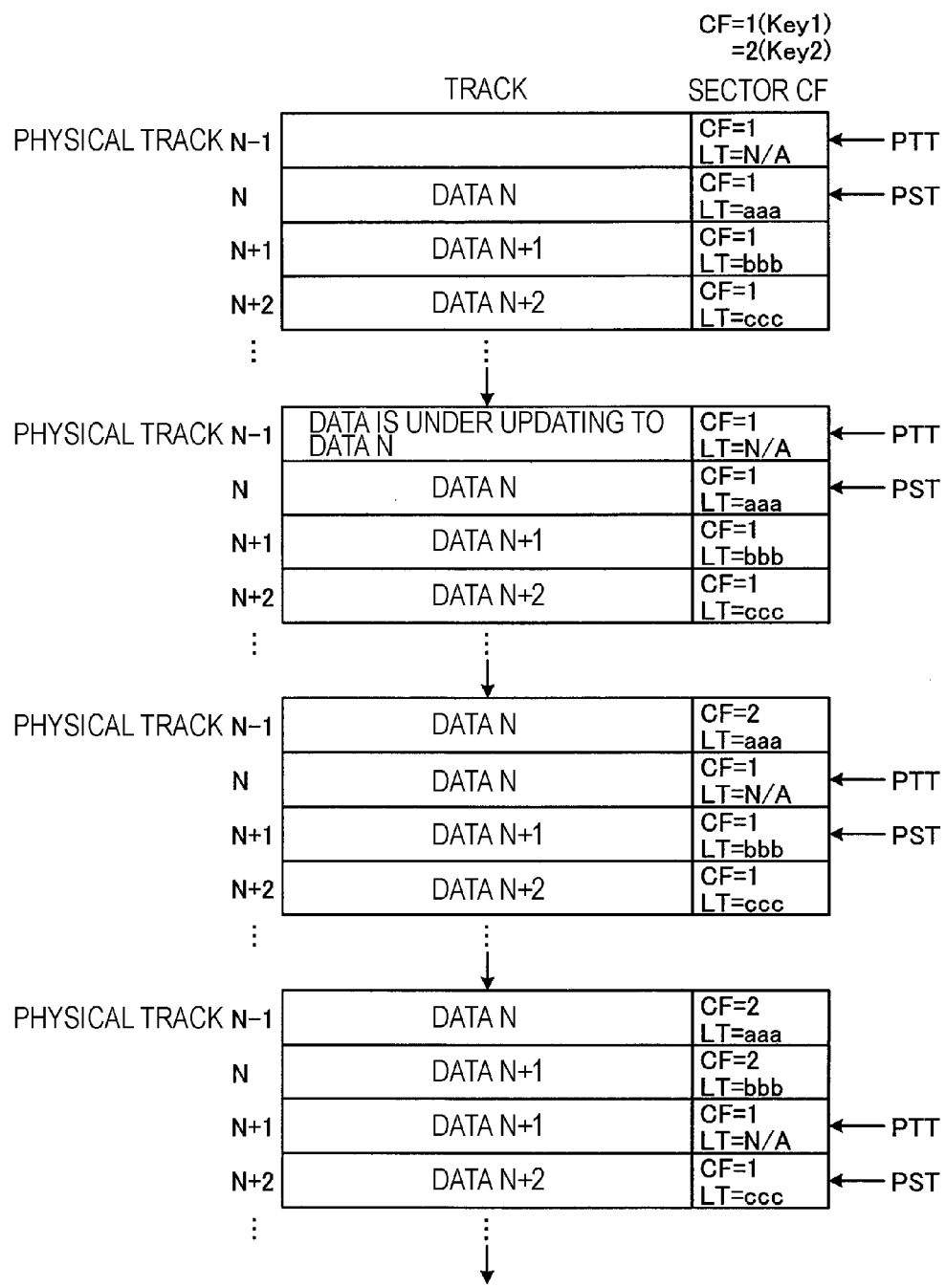
FIG. 4 illustrates a frame format detailing an outline of the key updating process.
Figure 5:
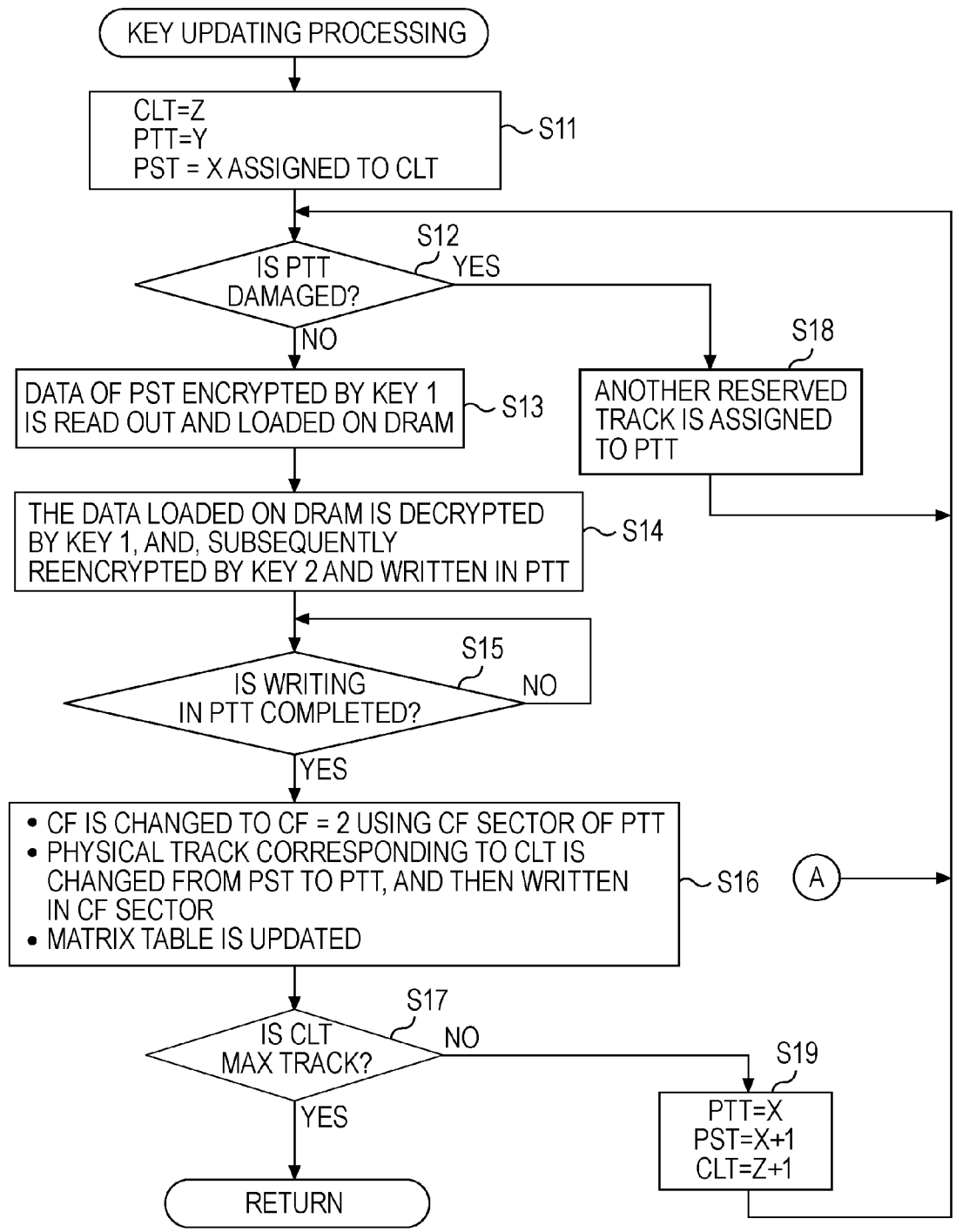
FIG. 5 illustrates a flowchart detailing the key updating process.

FIGS. 4 and 5 are views for explaining the key updating procedures to be executed by the controller 18. FIG. 4 is a frame format for explaining the outline of the key updating processing, and the FIG. 5 is a flowchart for explaining the detail of the key updating processing.

In FIGS. 4 and 5, CLT indicates Current Logical Track, PTT (Physical Target Track for new KEY) indicates a reserved track, and PST (Physical Source with old KEY) indicates an updating source track.

When the key updating processing is executed, the matrix table in the firmware is loaded in the DRAM 19, and updated in the DRAM 19, and the current values of the CLT/PTT/PST are held.

In FIG. 4, a Physical Track where effective user data is not written is denoted as Physical Track N−1, and Physical Tracks where user data are written, are denoted as Physical Tracks N to MAX. In the key updating processing of this embodiment, it is necessary to set at least one Physical Track where user data is not written, as a reserved track. User data written in Physical Tracks N to MAX is denoted as N to MAX, respectively. In order to protect data even if the power were to shutdown during the key update processing (not a normal system shutdown, but when the power supply is suddenly turned off), each Physical Track is equipped with a CF sector (Control Flag sector: control area) where CF (Control Flag) and LT (Logical Track) are recorded. If CF=1, it indicates that data is encrypted using the first encryption key KEY 1, and if CF=2, it indicates that data is encrypted using the second encryption key KEY 2.

First, Physical Tracks N−1 and N are set in the PTT (first reserved track) and PST (first updating source track), respectively, data N written in the Physical Track N is decrypted using the first encryption key KEY 1, subsequently, the data N is encrypted using the second encryption key KEY 2 and then written in the Physical Track N−1. After the writing is completed, CF of the CF sector in the Physical Track N−1 is set to "2", and LT assigned to the Physical Track N is assigned to the track N−1, then these are recorded in the LT of the CF sector, and the matrix table is updated. This causes the Physical Track N−1 to be effective and the Physical Track N to be invalid, and next, Physical Tracks N and N+1 are set in the PTT (second reserved track) and PST (second updating source track), respectively, then the data N written in the Physical Track N+1 is decrypted using the first encryption key KEY 1, subsequently, the data N is encrypted using the second encryption key KEY 2, which is written in the Physical Track N.

Upon completion of writing of data in the Physical Track N, "2" is recorded in CF of the CF sector in the Physical Track N, LT assigned to the Physical Track N+1 is assigned to the Physical Track N, and these are recorded in LT of the CF sector, and the matrix table is updated. Next, Physical Tracks N+1 and N+2 are set in the PTT (third reserved track) and PST (third updating source track), respectively. Hereinafter, similar processing is performed up to Physical Track MAX. In order to execute the key updating processing in a higher speed, it is desirable for the pair of the PTT and PST to be set in neighboring Physical Tracks. The key updating processing can be completed by two turns of the disk in the shortest manner. Here, the updating source track is set in the next reserved track, however, the next reserved track is not limited to the updating source track, another track where effective user data is not recorded may be used. Moreover, upon completion of writing data in a Physical Track, CF of the CF sector in the Physical Track is recorded, however, the CF may be recorded in the Physical Track at the same time of writing of the data in the Physical Track.

In addition, even if the power supply is shutdown in the middle of writing data in the Physical Track N−1, and the sector on the Physical Track N−1 is broken, since the under writing Physical Track N−1 is not made effective, and is not also assigned with LT, there is no possibility of data loss. Moreover, when the power supply is shutdown at the moment when the writing in the Physical Track N−1 is completed and made effective, and assigned with LT, there is a possibility that both of the Physical Tracks N−1 and N are made effective by same data and assigned with same LT, however, since the writing of the Physical Tracks N−1 is completed using the second encryption key KEY 2, and the LT is assigned to the Physical Tracks N−1, Physical Track N may be considered as being invalid.

In FIG. 5, first, Physical Track X assigned to CLT=Z, PTT=Y. PST=CLT (LT=0) is set (step S11). Where, Y is a reserved track where effective user data is not written. Followed by, whether the PTT is damaged or not, is determined (step S12). When the PTT is damaged ("Yes" in step S12), another reserved track is assigned to the PTT (step S13), and the procedure returns to step S12.

When the PTT is not damaged ("No" in step S12), data of the PST encrypted using the first encryption key is read out, then loaded to the DRAM 19 (step S13), and reencrypted using the second encryption key KEY 2, subsequently, the data reencrypted using the second encryption key KEY 2 is written in the PTT (step S14). Upon completion of the data of the PTT ("Yes" in step S15), CF=2 is written in the CF sector, the CLT is written in the CF sector by changing the Physical Track corresponding to the CLT from the PST to the PTT, and the matrix table is changed (step S16).

Then, whether the CLT is MAX track or not is determined (step S17), and when the CLT is the MAX track ("Yes" in step S17), the key updating processing is finished. On the other hand, when the CLT is not the MAX track ("No" in step S17), the following conditions: PTT=W, PST=X+1, and CLT=Z+1 (step S19) are set, subsequently, the procedure returns to step S12, and the same processing is repeatedly executed until CLT=MAX track is satisfied.

When a system ending command from the host device 30 based on the normal operation is inputted during updating processing, the key updating processing is interrupted, then the matrix table and the CLT/PTT/PST on the DRAM 19 are recorded in the disk 11, and waiting information indicating that the key updating processing is in a stand-by state is recorded in the disk 11. After that the power supply is turned off. When the power supply is turned on, if the waiting information is recorded, the matrix table and the CLT/PTT/PST recorded in the disk 11 is loaded on the DRAM 19, and the key updating processing is restarted from the interrupted processing.

Figure 6:
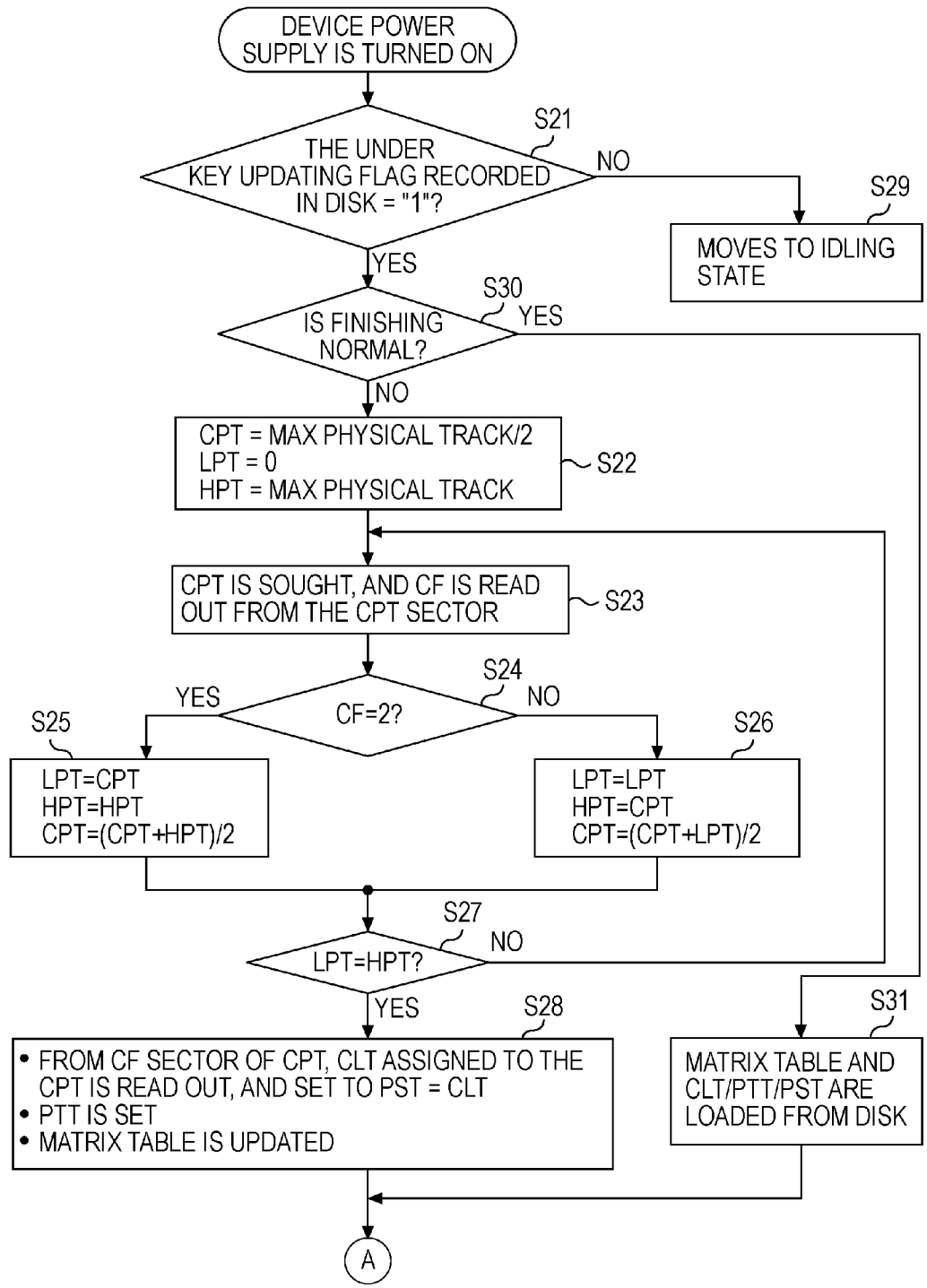
FIG. 6 illustrates a flowchart detailing the key updating process when a power supply is turned on after it is shut down during the key updating process.

FIG. 6 is a view for explaining the key updating processing when the power supply is turned on after power shutdown has occurred during the key updating processing. In FIG. 6, LTP is denoted as a Lower Physical Track, and HPT is denoted as a Higher Physical Track.

In FIG. 6, when the device power supply is turned on, whether the under key updating flag recorded in the disk 11 is "1" or not, is determined (step S21). When the under key updating flag is not "1" ("No" in step S21), the procedure moves to an idling state (step S29). When the under key updating flag is "1" ("Yes" in step S21), whether the finishing is normal or not, is determined (step S30). Specifically, as described above, when the waiting information is recorded in the disk 11, the finishing determined as being normal, and when the waiting information is not recorded, the finishing determined as being not normal. When the finishing is normal ("Yes" in step S30), the matrix table and the CLT/PTT/PST recorded in the disk 11 is loaded on the DRAM 19 (step S31), subsequently the processing moves to step 12 in FIG. 5, and the key updating processing is continued. On the contrary, when the finishing is not normal ("No" in step S30), the following conditions: CPT=MAX Physical Track/2, LPT=0, and HPT=MAX Physical Track are set (step S22).

After that, the CPT of the disk 11 is sought, then the CF is read out from the CF sector thereof (step S23). Then whether CF=2 or not, that is whether the CPT is encrypted using the second encryption key KEY 2 or not, is determined (step S24). When CF=2 ("Yes" in step S24), the following conditions: LPT=LPT, HPT=CPT, and CPT=(CPT+HPT)/2 are set (step S25). On the other hand, when the CPT is not encrypted using the second encryption key KEY 2 ("No" in step S24), the following conditions: LPT=LPT, HPT=CPT, and CPT=(CPT+LPT)/2 are set (step S26).

After that, whether LPT=HPT is satisfied or not, is determined (step S27), and when LPT=HPT is not satisfied ("No" in step S27), the processing returns to step S23, while when LPT=HPT is satisfied ("Yes" in step S27), the CLT assigned to the CPT is read out from the CF sector of the CPT, and set as PST=CLT, subsequently, the PTT is searched, and the matrix table is updated to current one (step S28). This is because the updated content of the matrix table is lost due to power shutdown. After resetting the CLT, PST, and PTT, the procedure is moves to step S12 in FIG. 5, and the key updating processing is continued.

In this manner, even when the power supply is turned on after power shutdown during key updating processing, by confirming the CF of the Physical Track located at ½ of each area, the Physical Track where the key updating processing is interrupted, can be searched. When the number of the entire Physical Tracks is MAX, seeking should be done at $\log_2$ (MAX) times. For example, if the number of the entire Physical Tracks is 240,000, the final Physical Track where the updating of the encryption key is completed, can be sought by 18 times of seeking (about 300 msecs.).

As described in this first embodiment, since the controller 18 acts as setting module configured to set a pair of an updating source track and a reserved track for each track of the magnetic recording medium; a reading module configured to read out the data encrypted using the first encryption key KEY 1 from the updating source area set by the setting module, and decrypt the data using the first encryption key KEY 1; and re-encrypting module configured to reencrypt the data decrypted by the reading module, using the second encryption key KEY 2, and recording the data in the reserved area set by the setting module; where, the setting module, in the key updating processing, first, an track where effective user data is not recorded, is set as a first reserved track, and a first updating source track is set, next, the first updating source track is set as a second reserved track, and a second updating source track is set, and these steps are repeated until all tracks to be subjected to the key updating processing have been subjected to the key updating processing, when data is recorded in the disk with being encrypted using an encryption key, the encryption key can be changed easily and in a high speed.

Moreover, according to this embodiment, since the under key updating key indicating that the key updating processing is continuing or not, is recorded in the disk 11, and the CF indicating the kinds of the encryption key used for encryption is recorded in each Physical Track, even when the procedure is returned from the power shutdown during the key updating processing, the key updating processing can be restarted from the interrupted position, thereby, there is no possibility of data loss due to the power shutdown during the key updating. Additionally, even when the procedure is returned from the power shutdown during the key updating processing, in a moderate configuration without using the non-volatile memory, the key updating processing can be restarted from the interrupted position.

Moreover, in accordance with this embodiment, since the pair of the updating source track and the reserved track is made of neighboring Physical Tracks, the key updating processing can be executed in a higher speed.

Figure 7:
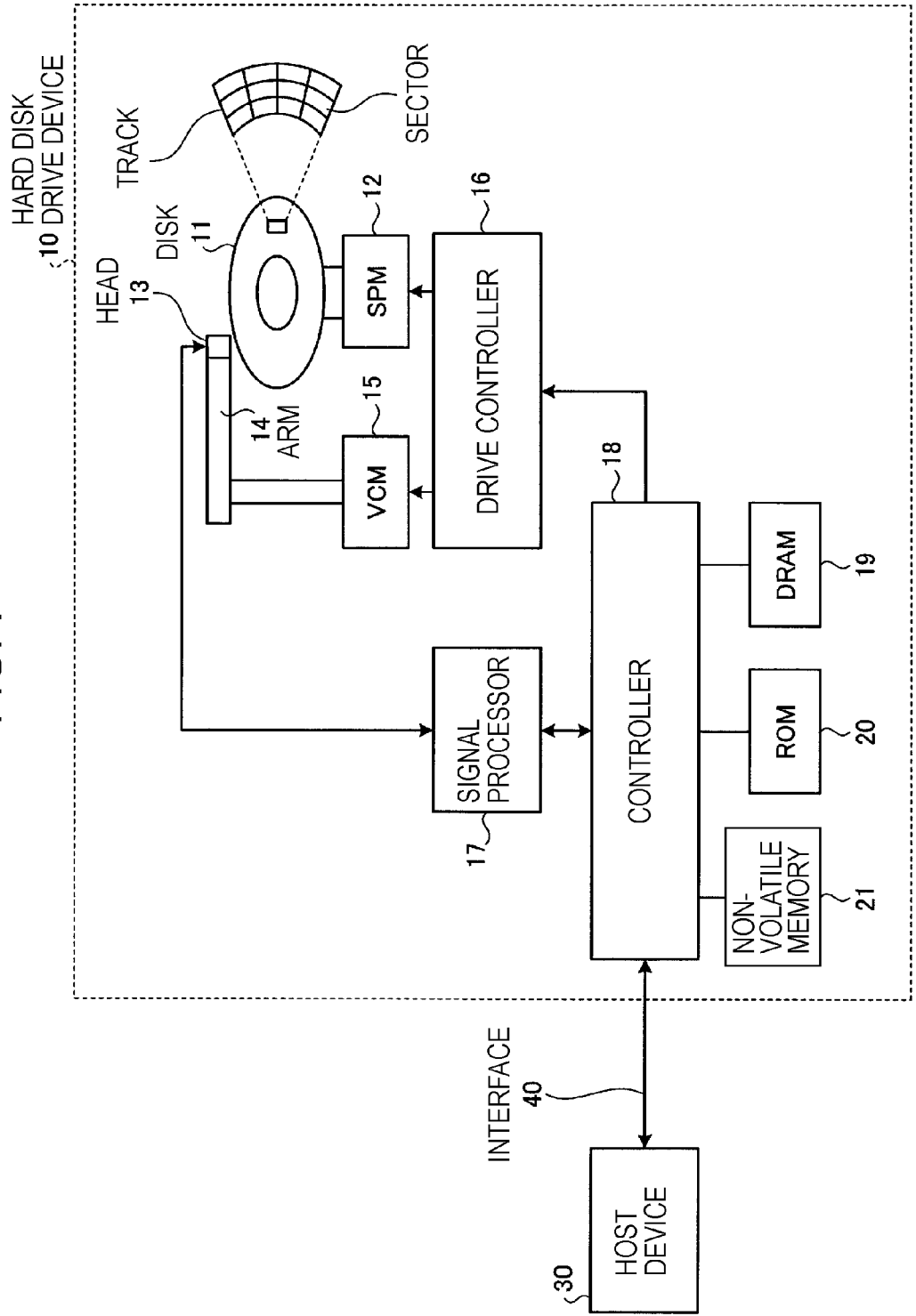
FIG. 7 illustrates a schematic configuration of an exemplary hard disk device applied by a magnetic recording device according to a second preferred embodiment of the present invention.

The discussion now turns to an alternative embodiment of the present invention, which will be described with reference to FIGS. 7 to 11. FIG. 7 is a view showing a configuration example of the hard disk device according to Example 2. In FIG. 7, components with same functions as those of FIG. 1, are denoted by same symbols, and description of common parts will be eliminated, and only different parts will de described.

A hard disk device 10 according to this embodiment, as shown in FIG. 7, has a configuration where a non-volatile memory 21 is mounted on the hard disk device of Example 1. A controller 18, when key updating processing is executed, an under key updating flag, a matrix table, and CLT/PTT/PST are stored in the non-volatile memory 21. In Example 2, since the non-volatile memory 21 is mounted, it is not required to provide a CF sector in a disk 11 as in Example 1, enabling simplification of the key updating processing.

Figure 8:
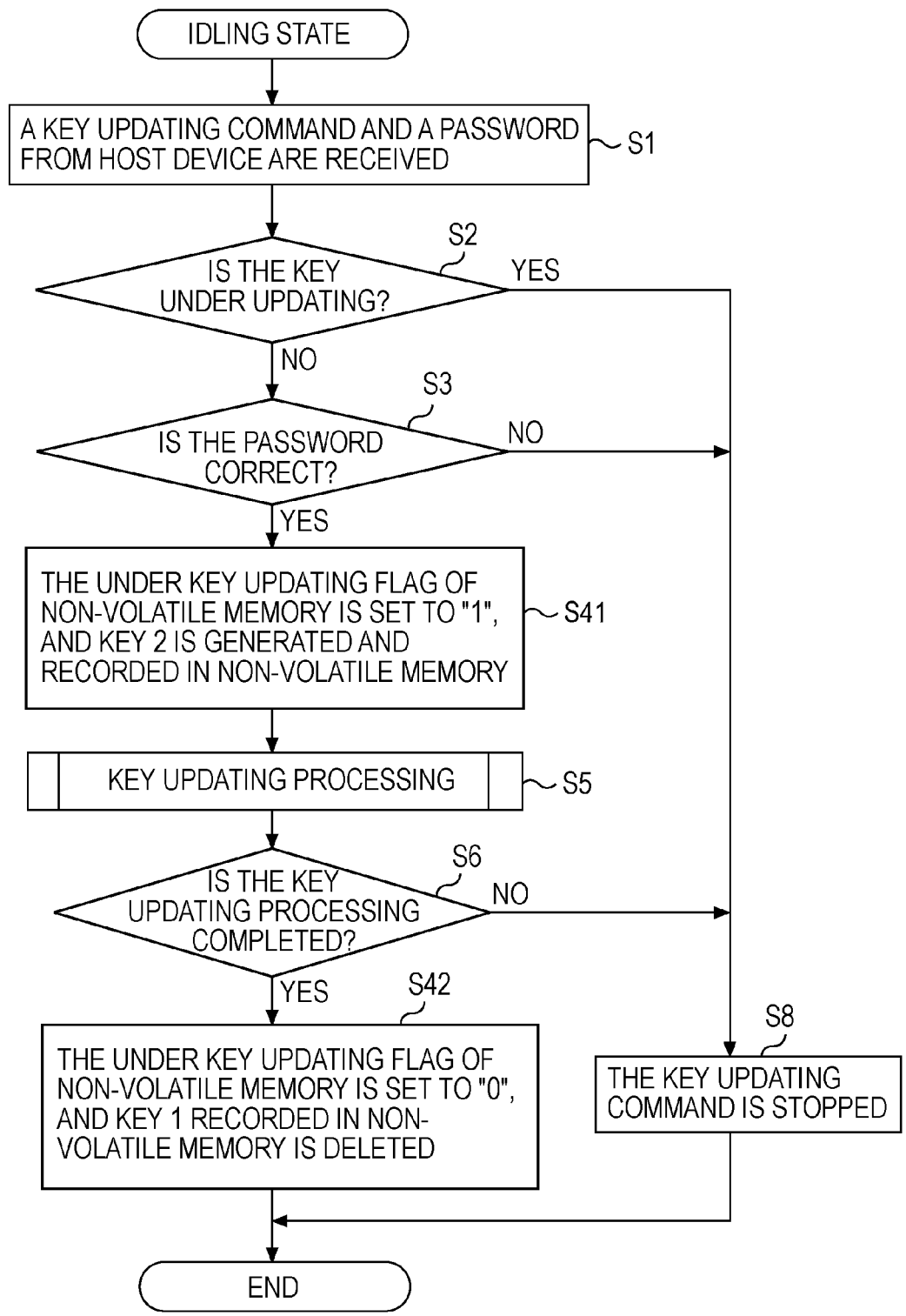
FIG. 8 illustrates a flowchart detailing the process for updating an encryption key according to a second preferred embodiment of the present invention.

Next, with reference to FIGS. 8 to 11, the key updating processing according to this embodiment will be described in detail. FIG. 8 is a flowchart for explaining the updating procedure of an encryption key. In FIG. 8, steps executing similar processing as FIG. 3 will be denoted by same step numbers, the description thereof will be eliminated, and only different points will be described.

In FIG. 8, a controller 18, when a password is determined as being correct ("Yes" in step S3), an under key updating flag recorded in a non-volatile memory 21 is set to "1", and an encryption key KEY 2 is generated, and recorded in a non-volatile memory 21 (step S41). The controller 18, when the key updating processing is finished ("Yes" in step S6), the under key updating flag in the non-volatile memory 21 is set to "0", and a first encryption key KEY 1 in the non-volatile memory 21 is deleted (step S42).

Figure 9:
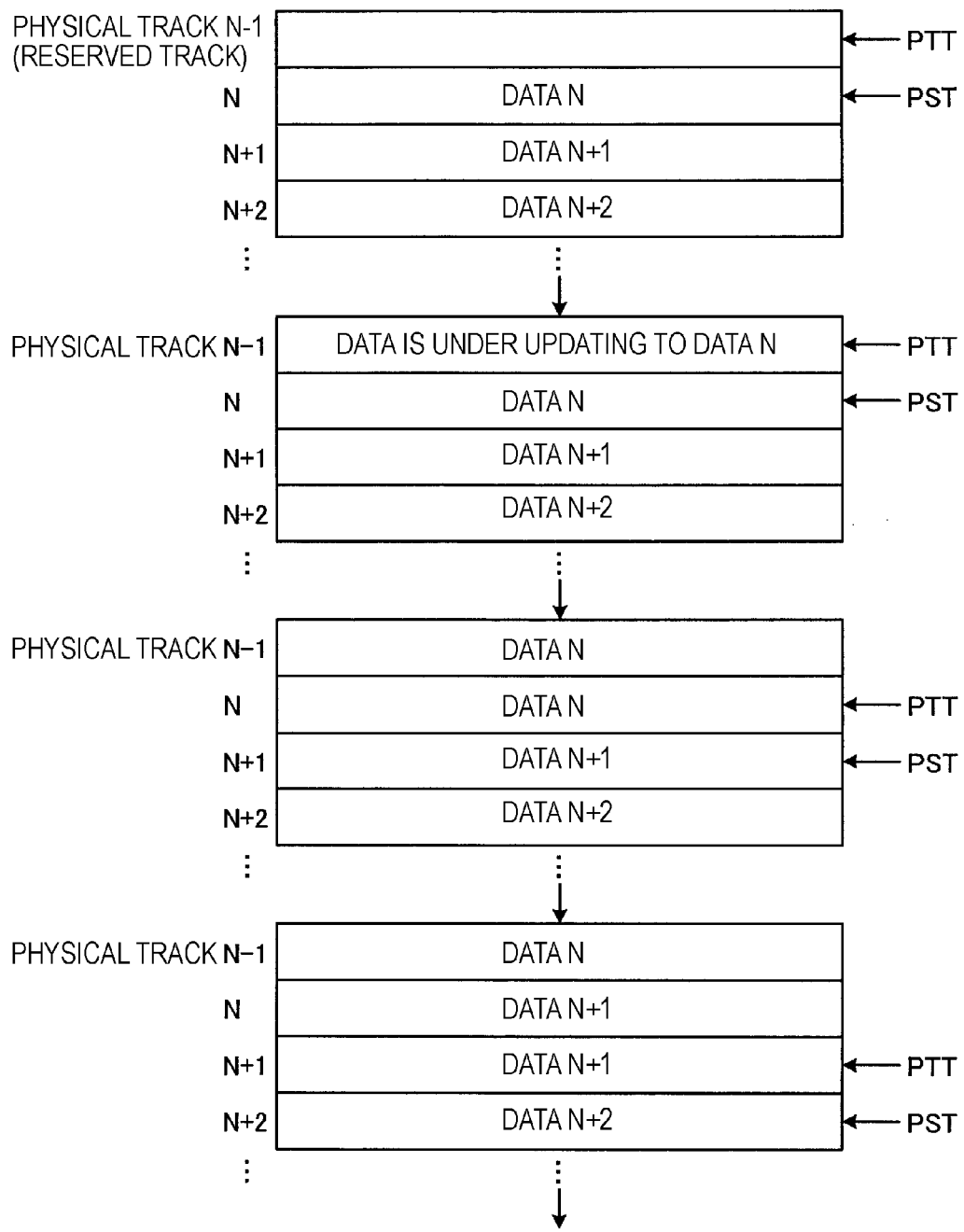
FIG. 9 illustrates a frame format detailing an outline of the key updating process.
Figure 10:
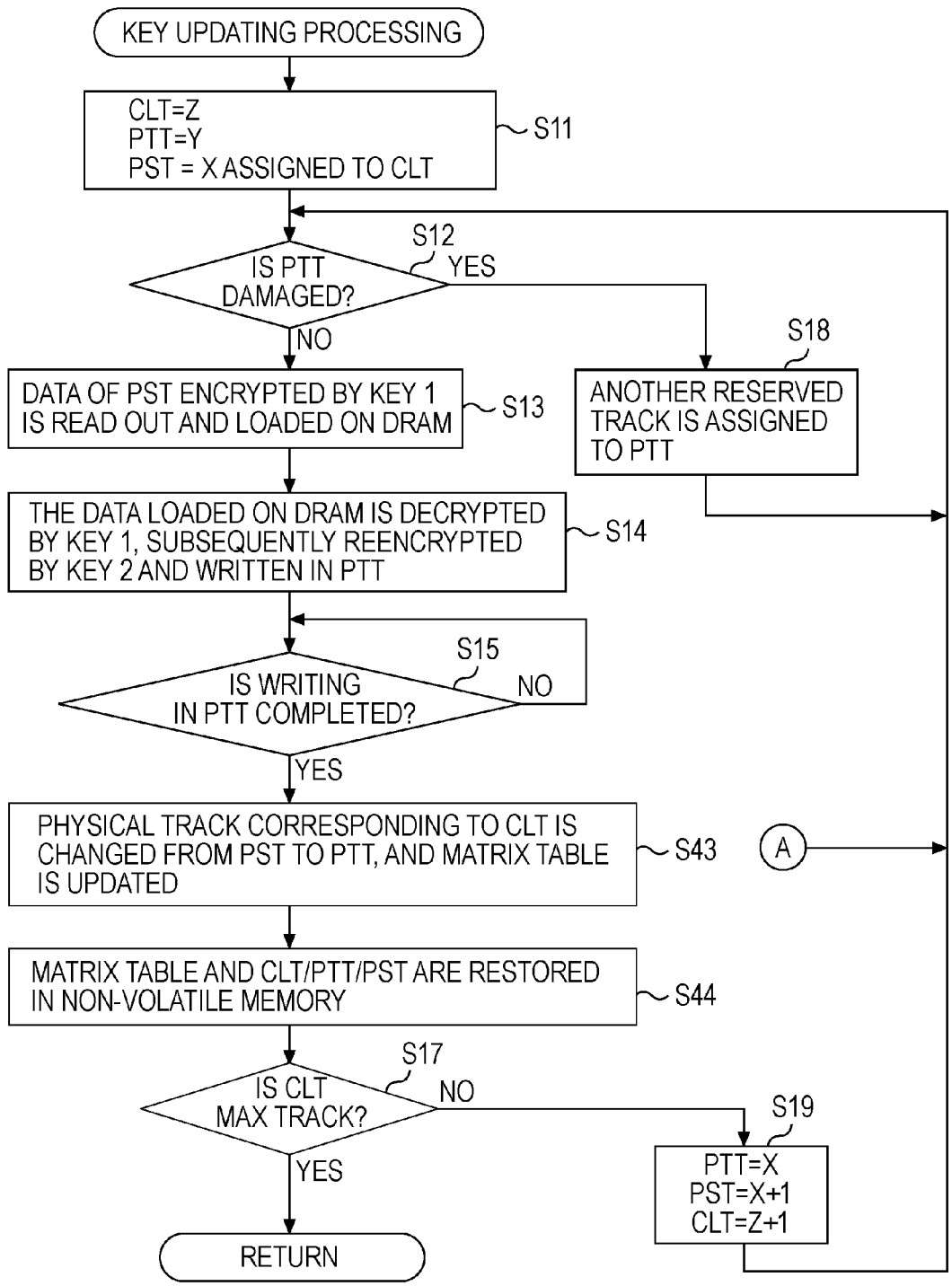
FIG. 10 illustrates a flowchart detailing the key updating process.

FIGS. 9 and 10 are views for explaining the key updating processing executed by the controller 18 in this embodiment; FIG. 9 is a frame format for explaining the outline of the key updating processing, and FIG. 10 is a flowchart for explaining the detail of the key updating processing.

In FIG. 9, the point different from in FIG. 4 is in that a disk 11 has no CF sector, and another processing is similar to that of FIG. 4. In Example 2, when the key updating processing is executed, a matrix table of firmware is loaded on the DRAM 19 and updated on the DRAM 19, and the current values of CLT/PTT/PST are held on the DRAM 19. The matrix table and the CLT/PTT/PST on the RRAM 19 are restored in the non-volatile memory 21.

In FIG. 10, steps executing similar processing as FIG. 5 will be denoted by same step numbers, the description thereof will be eliminated, and only different points will be described. In FIG. 10, after completion of data writing ("Yes" in step 15), matrix table is updated (step S43) by converting a Physical Track corresponding to CLT from PST into PTT. Then the matrix table and the CLT/PTT/PST are restored in the non-volatile memory 21 (step S44).

Figure 11:
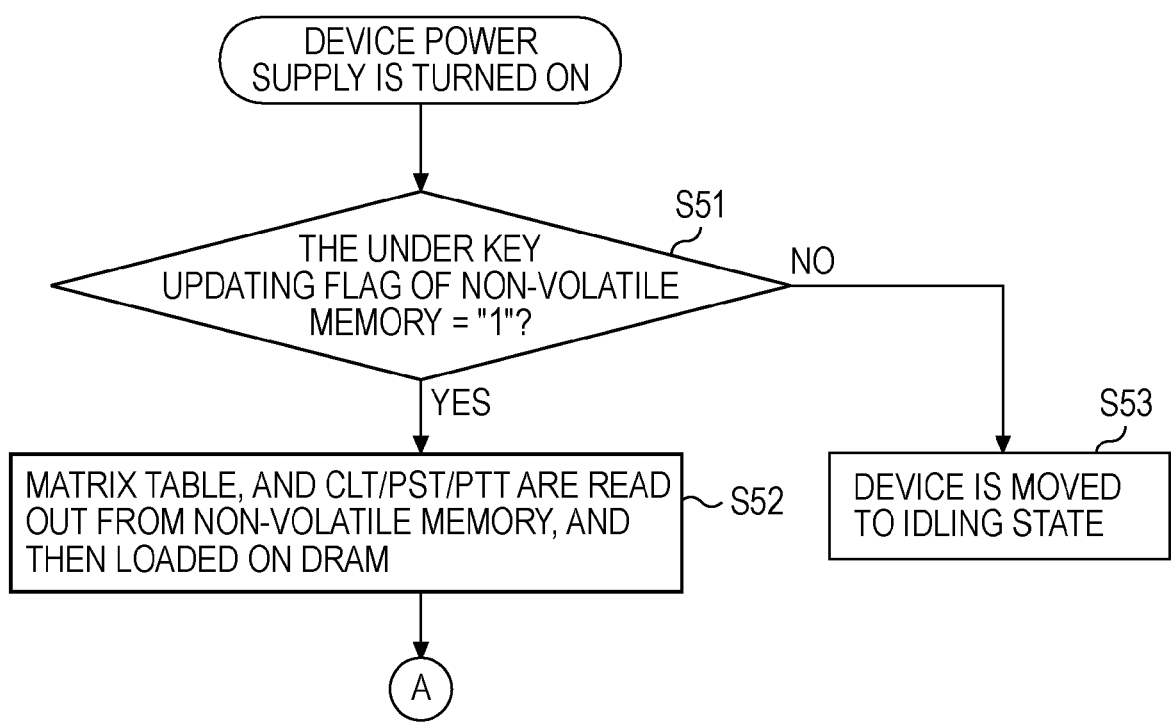
FIG. 11 illustrates a flowchart detailing the key updating process when a power supply is turned on after it is shut down during the key updating process.

FIG. 11 is a view for explaining the key updating processing when a power supply is turned on. In FIG. 11, when the device power supply is turned on, whether the under key updating flag in the non-volatile memory 21 is "1" or not, is determined (step S51). When the under key updating flag is not "1" ("No" in step 51), the procedure moves to an idling state (step S53). While, when the under key updating flag is "1" ("Yes" in step 51), the procedure moves to step 12 in FIG. 10 by reading out the matrix table and the CLT/PTT/PST from the non-volatile memory 21, then loading them on the DRAM 19, and the key updating step is restarted from the interrupted position.

In accordance with this embodiment, since the non-volatile memory 21 is provided, where the under key updating flag indicates whether the key updating processing is continuing or not, and the current values of the PTT (reserved track) and PST (updating source track) are recorded, even when the procedure is returned from the power shutdown during the key updating processing, the key updating processing is easily restarted from the interrupted position, resulting in no possibility of data loss due to the power shutdown during the key updating processing.

In the two embodiments of the invention discussed above, the key updating processing is executed for each track. The present invention, however, is not limited these embodiments. Rather, in a third embodiment of the invention the key updating processing may be executed for each sector and the discussion now turns to this embodiment.

Figure 12:
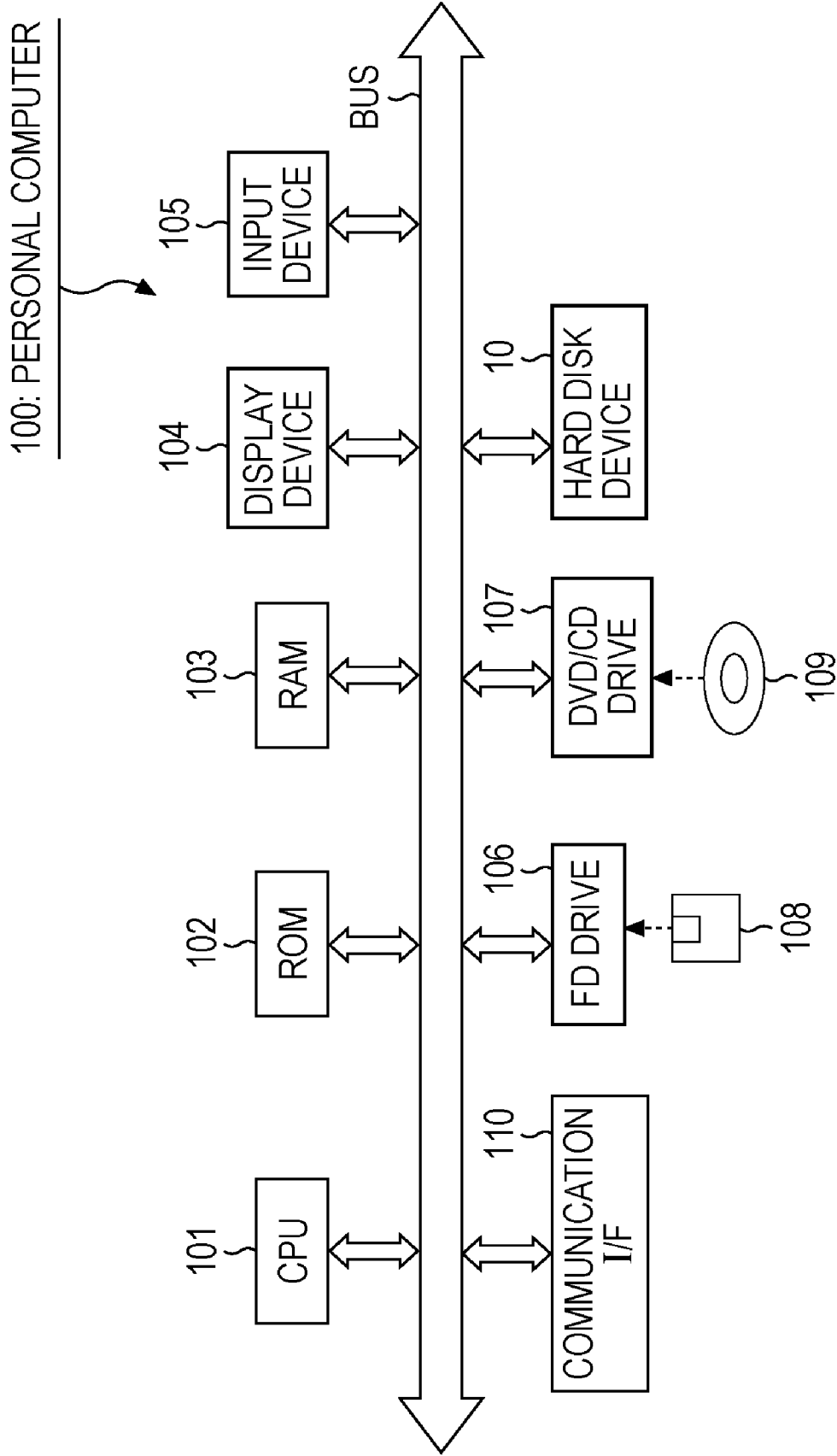
FIG. 12 illustrates a configuration of an exemplary personal computer.

The hard disk devices 10 of the previous embodiments are widely applicable to Personal Computers (PS), Audio Visual systems (for example, video recorders), and the like. FIG. 12 is a view showing a case where the hard disk devices 10 of the above mentioned embodiments are applied to the Personal Computers. A personal computer 100, as shown in FIG. 12, includes a CPU 101; a ROM 102; a RAM 103; a display device 104; an input device 105; a FD drive 106 executing reading/writing of data with respect to a FD 108, a DVD/CD drive 107 reading the data of DVD/CD 109; a communication I/F 110; and a hard disk device 10.

In addition, in the above embodiments hard disk devices are described, however, the magnetic recording device according to the present invention is not limited to the hard disk devices, rather, it is applicable to another magnetic recording media for recording data for each track or sector, for example, a flexible disk, a CD-R (Compact Disk-Recordable), a DVD-R (Digital Versatile Disk-Recordable), and an optical magnetic disk.

An embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

The order of steps given herein is for exemplary purposes only and should not be interpreted as limiting with respect to other embodiments which are possible using a different order of steps in implementing the inventive concepts described herein. Any ordering of steps in the claims are for the purpose of improving clarity and do not imply any particular order of steps to be taken.

In the drawings and specifications there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety herein.

The invention claimed is:

1. A system comprising:
a magnetic recording medium having data subjected to full disk encryption using a first encryption key;
a setting module configured to set an updating source area and a reserved area for each unit of the magnetic recording medium;
a reading module configured to, responsive to receipt of a password and a key updating command, read data of each unit of the magnetic recording medium encrypted using the first encryption key from the updating source area and decrypt the data using the first encryption key;
a re-encryption module configured to, responsive to receipt of the password and the key updating command, re-encrypt decrypted data using a second encryption key, and record the re-encrypted data in the reserved area;
wherein, the setting module is further configured to repeat until all units of the magnetic recording medium containing data encrypted using the first encryption key have been re-encrypted using the second encryption key.

2. The system of claim 1, wherein each unit of the magnetic recording medium has a control area where a control flag indicating the kind of encryption key used for encryption is recorded; and the system further comprising:
an under key updating flag recording module configured to record in the magnetic recording medium an under key updating flag indicating whether repeating is continuing; and
a control flag recording module configured to record a control flag indicating that data corresponding to the reserved area is encrypted using the second encryption key in a control area of the reserved area, during at least one of the same time when the data is written with respect to the reserved area and every time when the writing is completed.

3. The system according to claim 1, wherein the updating source area and the reserved area are adjacent.

4. The system according to claim 1, wherein the magnetic recording device is a hard disk device.

5. The system according to claim 1, wherein the unit is a track.

6. The system according to claim 1, wherein the unit is a sector.

7. The system according to claim 2, wherein the setting module is further configured to:
resume repeating after a premature termination of the repeating at the area being processed at the time of the premature termination; and
refer to the under key updating flag and, if the under key updating flag indicates repeating, refer to the control flag in connection with the resumption of repeating.

8. The system of claim 2, further comprising:
a non-volatile memory; and
wherein the under key updating flag recording module is further configured to record the under key updating flag in the non-volatile memory; and
an updating information recording module is configured to record current values of the set updating source area and the set reserved area in the non-volatile memory.

9. The system of claim 8, wherein the setting module is further configured to:
resume repeating after premature termination of the repeating; and
referring to the under key updating flag recorded in the non-volatile memory and, if the under key updating flag recorded in the non-volatile memory indicates repeating at the time of premature termination, referring to the current values of the updating source area and the reserved area recorded in the non-volatile memory in connection with determining the area from which repeating should be resumed.

10. A method comprising:
setting an updating source area and a reserved area for each unit of a magnetic recording medium, the magnetic recording medium having data subjected to full disk encryption using a first encryption key;
reading data, responsive to receipt of a password and a key updating command, of each unit of the magnetic recording medium encrypted using the first encryption key from the updating source area and decrypting the data using the first encryption key;
re-encrypting, responsive to receipt of the password and the key updating command, decrypted data using a second encryption key, and recording the re-encrypted data in the reserved area; and wherein the setting step comprises:
  repeating until all units of the magnetic recording medium containing data encrypted using the first encryption key have been re-encrypted using the second encryption key.

11. The method of claim 10, further comprising:
  recording in a control area of the magnetic recording medium a under key updating flag indicating whether repeating is continuing; and
  recording in the control area of the magnetic recording medium a control flag indicating that data corresponding to the reserved area is encrypted using the second encryption key in a control area of the reserved area, during at least one of the same time when the data is written with respect to the reserved area and every time when the writing is completed.

12. The method according to claim 10, wherein the updating source area and the reserved area are adjacent.

13. The method according to claim 10, wherein the magnetic recording device is a hard disk device.

14. The method according to claim 10, wherein the unit is a track.

15. The method according to claim 10, wherein the unit is a sector.

16. The method according to claim 11, further comprising:
  resuming repeating after a premature termination of the repeating at the area being processed at the time of the premature termination; and
  referring to the under key updating flag and, if the under key updating flag indicates repeating, referring to the control flag in connection with the resumption of repeating.

17. The method claim 11, further comprising:
  recording the under key updating flag in a non-volatile memory; and
  recording current values of the set updating source area and the set reserved area in the non-volatile memory.

18. The method of claim 17, wherein the setting step further comprises:
  resuming repeating after premature termination of the repeating; and
  referring to the under key updating flag recorded in the non-volatile memory and, if the under key updating flag recorded in the non-volatile memory indicates repeating at the time of premature termination, referring to the current values of the pair of the updating source area and the reserved area recorded in the non-volatile memory in connection with determining the area from which repeating should be resumed.

19. A computer program product readable by machine, tangibly embodying a program of instructions executable by the machine to perform a method comprising the steps of:
  setting an updating source area and a reserved area for each unit of a magnetic recording medium, the magnetic recording medium having data subjected to full disk encryption using a first encryption key;
  reading data, responsive to receipt of a password and a key updating command, of each unit of the magnetic recording medium encrypted using the first encryption key from the updating source area and decrypting the data using the first encryption key;
  re-encrypting, responsive to receipt of the password and the key updating command, decrypted data using a second encryption key, and recording the re-encrypted data in the reserved area; and
  wherein the setting step comprises:
    repeating until all units of the magnetic recording medium containing data encrypted using the first encryption key have been re-encrypted using the second encryption key.

20. The computer program product readable by machine according to claim 19, wherein the method steps further comprise:
  recording in a control area of the magnetic recording medium an under key updating flag indicating whether repeating is continuing; and
  recording in the control area of the magnetic recording medium a control flag indicating that data corresponding to the reserved area is encrypted using the second encryption key in a control area of the reserved area, during at least one of the same time when the data is written with respect to the reserved area and every time when the writing is completed.

* * * * *